United States Patent
Sill et al.

(10) Patent No.: US 7,830,847 B1
(45) Date of Patent: Nov. 9, 2010

(54) MULTI-CARRIER CAPACITY INCREASE IN LOW-COST INTERNET BASE STATION (LCIB) SYSTEMS BY LOGICAL GROUPING OF BASE STATIONS

(75) Inventors: Timothy W. Sill, Platte City, MO (US); Bryan T. Barbee, Olathe, KS (US); Jason M. Jugar, Centreville, VA (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 761 days.

(21) Appl. No.: 11/781,829

(22) Filed: Jul. 23, 2007

(51) Int. Cl.
*H04L 12/56* (2006.01)
(52) U.S. Cl. .................. 370/338; 455/446
(58) Field of Classification Search .......... 370/338; 455/446
See application file for complete search history.

(56) References Cited

U.S. PATENT DOCUMENTS

| | | | |
|---|---|---|---|
| 5,475,870 A | 12/1995 | Weaver, Jr. et al. | |
| 5,584,049 A | 12/1996 | Weaver, Jr. et al. | |
| 5,878,328 A | 3/1999 | Chawla et al. | |
| 6,477,154 B1 * | 11/2002 | Cheong et al. | 370/328 |
| 2004/0204097 A1 | 10/2004 | Scheinert et al. | |
| 2009/0296635 A1 * | 12/2009 | Hui et al. | 370/328 |

OTHER PUBLICATIONS

Unpublished U.S. Appl. No. 12/400,920, entitled "Methods and System for Operating Densely-Deployed Low-Cost Internet Base Stations (LCIBs)", filed Mar. 10, 2009, in the name of Christopher M. Yenney et al.

* cited by examiner

*Primary Examiner*—Melvin Marcelo (57) ABSTRACT

Methods and systems are provided for multi-carrier capacity increase in low-cost Internet base station (LCIB) systems by logical grouping of base stations. In an embodiment, an LCIB controller determines that a set of multiple LCIBs should be logically grouped, and selects operational parameters for each LCIB in the set. The LCIB controller designates one LCIB as a primary LCIB, thereby designating the others as secondary LCIBs. The controller configures the primary LCIB to broadcast a pilot beacon that includes at least some of the operational parameters selected for each LCIB, and to operate using the parameters selected for the primary LCIB. The controller also configures each secondary LCIB to not broadcast a pilot beacon, and to operate using the parameters selected for the respective secondary LCIB.

20 Claims, 4 Drawing Sheets

MULTI-CARRIER CAPACITY INCREASE IN LOW-COST INTERNET BASE STATION (LCIB) SYSTEMS BY LOGICAL GROUPING OF BASE STATIONS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro base stations," and the network they collectively form—or to which they collectively belong—is referred to generally and herein as the "macro network."

Mobile stations and macro base stations conduct communication sessions (e.g. voice calls and data sessions) over a frequency known as a carrier, which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station(s), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to the cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. poor in-building coverage) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), ubicells, microcells (micro base stations, micro BTSs), and perhaps by other names. Note that the aforementioned terms that end in "cell" may also be generally and herein used interchangeably with the coverage area provided by the respective devices.

A typical LCIB may be approximately the size of a desktop phone or WiFi access point, and is essentially a low-power, low-capacity, low-cost version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e.

CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for multi-carrier capacity increase in LCIB systems by logical grouping of base stations. In one embodiment, an LCIB controller determines that a set of LCIBs should be logically grouped. The LCIB controller selects operational parameters for each respective LCIB in the set. The LCIB controller also designates a given LCIB in the set as a primary LCIB, thereby designating the other LCIBs in the set as secondary LCIBs.

Moreover, the LCIB controller configures the primary LCIB to broadcast a pilot beacon comprising acquisition information for all of the LCIBs in the set. The acquisition information comprises at least some of the operational parameters selected for each respective LCIB in the set. The LCIB controller further configures the primary LCIB to operate using the operational parameters selected for the primary LCIB. The LCIB controller also configures each secondary LCIB to not broadcast a pilot beacon, and to operate using the respective operational parameters selected for the respective secondary LCIB.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a house, etc. And along with limited transmission power, LCIBs are also designed to have a relatively low capacity for serving mobile stations. For example, an LCIB may provide a single CDMA carrier and have the capacity (e.g. channel elements) to provide service to up to five mobile stations at any given time. While this may be adequate for many contexts, there may be instances where a subscriber would like to have, for example, twice that capacity.

Thus, the subscriber may wish to install, in this example, two LCIBs covering the same geographic area, such as the same house. However, simply adding a second LCIB and powering it on will not be without issues, due at least in part to the fact that each of the LCIBs will transmit their own pilot beacon. In general, an LCIB uses its pilot beacon to transmit administrative messages and parameters that mobile stations can use to facilitate handoffs from the macro network to the LCIB's single carrier. Thus, among the purposes of the LCIB's pilot beacon is to advertise that carrier in the LCIB's coverage area. As such, the LCIB transmits its pilot beacon on the one or more macro-network carriers in the surrounding area.

In particular, after an initial auto-configuration process, each LCIB will transmit either what is known as and referred to herein as a "fixed" pilot beacon, or what is known as and referred to herein as a "frequency-hopping" pilot beacon. If the one or more macro base stations in the surrounding area all operate on the same single carrier, then the LCIBs will each transmit their pilot beacon on only that carrier (i.e. a fixed pilot beacon). If, however, multiple carriers are provided by the surrounding macro-network, the LCIBs will cycle through those carriers, transmitting their pilot beacon on each carrier for some fixed period of time (i.e. a frequency-hopping pilot beacon), such as a few hundred milliseconds (ms) or perhaps one or two seconds.

Thus, since each of the two LCIBs in our exemplary scenario are transmitting their own pilot beacons in the same small geographic area, an undesirable phenomenon known as pilot-beacon collisions will likely occur. That is, each LCIB's pilot beacon will interfere with the other LCIB's pilot beacon, making each one more difficult for mobile stations to decode. Moreover, the presence of these competing pilot beacons will also provide undesirable interference with the macro network. Mobile stations may have trouble determining with which LCIB they should communicate, and it would certainly be possible that one of the two LCIBs would end up overloaded with mobile stations while the other LCIB could be underutilized. That is, load-balancing between the two LCIBs would be a matter of luck.

As presently contemplated, in accordance with the invention, the operations of two or more associated, proximally-located LCIBs are intelligently coordinated, such that both LCIBs can provide service in overlapping coverage areas without interfering with each other, and without appearing as anything other than a single LCIB system to mobile stations operating on the macro network. One aspect of the invention that helps accomplish these advantages is that only one in a group of two or more associated LCIBs will broadcast a pilot beacon. That single pilot beacon will advertise both/all LCIBs in the system, such that mobile stations may hash among them and accomplish a desirable distribution of mobile stations. Thus, subscribers may increase capacity in their LCIB system in a manner somewhat analogous to the manner in which macro-network operators add capacity by adding additional carriers to macro base stations.

In accordance with the present invention, LCIBs may need a combination of software, firmware, and/or hardware that equips them with certain capabilities. One such capability is that the LCIB be able to provide service to mobile stations on any valid carrier assigned to it, rather than being configured to be limited to a single, specific carrier. A second such capability is that the LCIB be able to either transmit its pilot beacon or not, perhaps according to instructions received by the LCIB, perhaps from another LCIB or from an entity referred to herein as an LCIB controller (e.g. a network entity operated by the wireless service provider).

A third such capability is the ability of an LCIB to populate one or more messages—such as those known as channel list messages and neighbor lists—with any carrier or carriers, independent of whether the LCIB itself provides service on the carrier or carriers. The LCIB may then broadcast these messages in its pilot beacon, which may consist of a CDMA pilot channel, a CDMA paging channel, and a CDMA sync channel.

In accordance with exemplary embodiments, an LCIB controller may be provided as an entity on the wireless service provider's core network, accessible to one or more of the LCIBs in a given LCIB system via a VPN connection over the subscriber's broadband Internet connection. Note that "LCIB system" refers to one or more LCIBs operated by the same subscriber (e.g. customer, company), coordinated in accordance with the principles of the present invention. With respect to the LCIB controller, that may be any logical and/or physical entity that has visibility to, communicates with, and provides configuration information to LCIBs.

In addition to the LCIBs being provided with certain capabilities for carrying out the present invention, the LCIB controller may also have certain capabilities. A first such capability is the ability to associate multiple LCIBs with the same geographic area (or with overlapping geographic areas). A second such capability is the ability to associate multiple LCIBs with each other, i.e. to establish a logical pairing (or more generally a logical grouping) of LCIBs. A third such capability is the ability to assign operating parameters to the multiple LCIBs in a logical grouping, and do so in such a manner as to be able to assign different operating parameters to different LCIBs in a given logical grouping.

For the balance of this overview section, an example involving a logical grouping (a.k.a. pairing) of two LCIBs will be described. This is for illustration and not by way of limitation: any number of LCIBs may be logically paired (grouped) in accordance with the principles of the present invention. As an exemplary point for extending this two-LCIB example to more than two LCIBs, the description below of a primary LCIB and a secondary LCIB could be extended to a primary LCIB and multiple secondary LCIBs.

A somewhat initial step in accordance with the present invention is to recognize that the two LCIBs should be logically paired. This may be carried out by one or both of the LCIBs, and perhaps reported to the LCIB controller, or this may be carried out by the LCIB controller. As an example, the first LCIB may be powered on in the subscriber's home, and conduct an auto-configuration process, involving the first LCIB determining its own location (perhaps using its GPS receiver) and sending that location to the LCIB controller, and the LCIB controller providing the first LCIB with operating parameters (a carrier licensed by the service provider for that location, pseudorandom number (PN) offset, channel list message, etc.).

At some later time, the subscriber may power on the second LCIB in the subscriber's home. The second LCIB may then conduct its own auto-configuration process, during which the second LCIB will send a location to the LCIB controller that is the same or at least close enough to the first LCIB's location, such that the controller will recognize their proximity, perhaps along with recognizing that both the first LCIB and the second LCIB are associated with the same subscriber's account. And instead of the auto-recognition described above, the first and second LCIBs could also be manually paired in the service provider's system, perhaps in a situation where a particular solution is being arranged for a customer, perhaps a business or school.

In any event, the first and second LCIBs have now been logically paired by the LCIB controller, which then designates one of them (here the first LCIB) as the primary LCIB and designates the other (here the second LCIB) as the secondary LCIB. This designation could be done randomly or using some other selection criteria, such as an ordering of serial numbers or other identifiers, first in time to register with the controller, or any other method. And the designations as primary and secondary are not meant to convey anything other than two different labels: they could just as well be "the red LCIB" and "the blue LCIB," for example, or be associated with any other labeling scheme deemed suitable and/or desirable.

Next, the LCIB controller selects carriers for the primary and secondary LCIBs. Preferably, the LCIB will select (a) a first carrier for the primary LCIB and (b) a second (different than the first) carrier for the secondary LCIB, both of which are different from carriers used by nearby macro base stations. However, other possibilities exist, and the LCIB's options may be limited by the RF spectrum licensed to the particular service provider in the particular geographic area. Next, the controller selects a PN offset that both the primary and secondary LCIB will use (i.e. more generally that all LCIBs in an LCIB grouping would use). The LCIB controller also selects a transmission-power level that both the primary and secondary LCIB will use. In some embodiments, at least two LCIBs in a grouping may use different power levels.

The LCIB controller then transmits an updated set of operational parameters to the primary LCIB, configuring it to transmit its pilot beacon on the proper macro-network carrier (s), assigning the selected primary-LCIB carrier to the primary LCIB to use for traffic, the selected PN offset and transmission-power level, and populating the primary LCIB's pilot beacon with a channel-list message that lists the primary LCIB's carrier and the secondary LCIB's carrier (and generally all of the assigned carriers for the LCIBs in the logical grouping).

Next, the controller sends operational parameters to the secondary LCIB, configuring it to not transmit its pilot beacon, assigning the selected secondary-LCIB carrier to the secondary LCIB to use for traffic, and assigning the same PN offset and power level to the secondary LCIB that were assigned to the primary LCIB. Finally, the LCIB controller transmits any remaining configuration information needed for proper operation to the primary and/or secondary LCIB. Note that the order of the steps described above and herein generally is flexible, as long as the LCIBs are configured in accordance with the present invention.

Once configured, the primary and secondary LCIB have been logically paired, and are operating such that only the primary LCIB is transmitting a pilot beacon, thereby precluding pilot-beacon collisions, as well as interference and performance issues, that would be associated with multiple pilot-beacon transmissions. And the primary LCIB is broadcasting a channel-list message that lists both the traffic-bearing carrier for the primary LCIB and the traffic-bearing carrier for the secondary LCIB. This ensures that mobile stations entering the LCIB system hash between all (both) of the LCIBs in the grouping, resulting in a balanced utilization of LCIBs.

Moreover, additional improvements in performance may be realized by allowing mobile-station calls to be redirected between and among paired/grouped LCIBs, such as when resources are not available on one LCIB, but are available on the other (or on another). That is, a call may be either originated by a mobile station, or be inbound to a mobile station, where that mobile station is registered on a given LCIB that lacks resources (e.g. channel elements) to handle the call. In that case, the LCIB controller may scan the other LCIB or LCIBs that are logically grouped with the given LCIB, in order to determine whether sufficient resources to handle the call are available on another grouped LCIB. If so, the LCIB controller may direct the mobile station—perhaps using a Traffic Channel Assignment Message (TCAM)—to tune to the carrier of the grouped LCIB that has sufficient resources available.

In another example, although resources may be available on, say, the primary LCIB, the LCIB controller may determine that it would be desirable to load balance across paired LCIBs. For example, the primary LCIB may be close to exhausting its RF power resources while the secondary LCIB may have most of its power available. In that circumstance, a call may be directed from the primary LCIB to the secondary LCIB to make better use of available resources.

With respect to call flows, after hashing to the appropriate carrier via the pilot-beacon channel-list message broadcast by the primary LCIB, mobile stations will register with the LCIB associated with that carrier, and may then make and receive calls using that carrier-and-LCIB combination. For load-balancing or other considerations, mobile stations could be reassigned.

2. Exemplary Architecture a. An Exemplary Communication System

Figure 1:
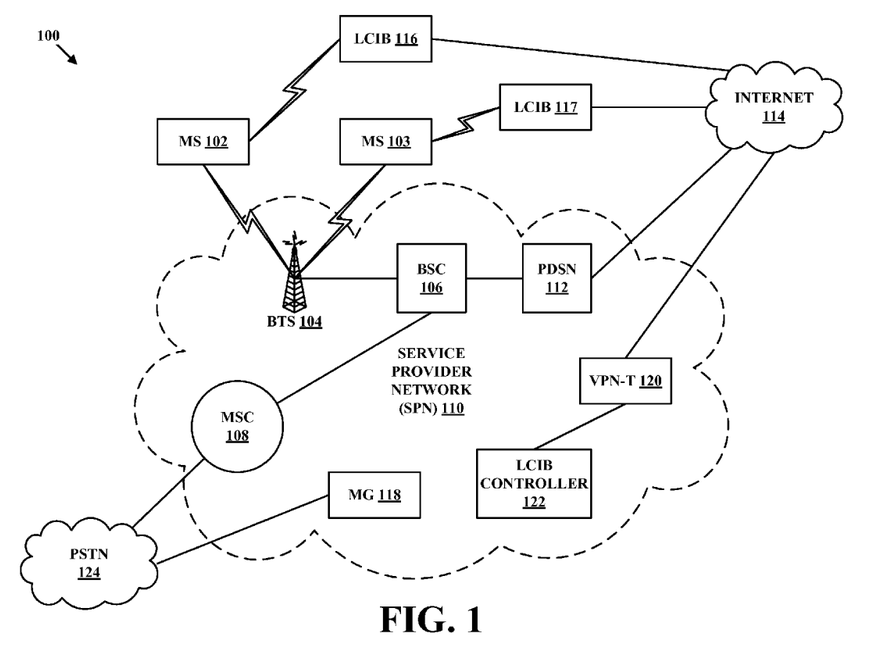
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes mobile stations (MS) 102 and 103, a macro BTS 104, a base station controller (BSC) 106, a mobile switching center (MSC) 108, a service provider network (SPN) 110, a packet data serving node (PDSN) 112, the Internet 114, LCIBs 116 and 117, a media gateway 118, a VPN terminator (VPN-T) 120, an LCIB controller 122, and a public switched telephone network (PSTN) 124, And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the respective links between LCIBs 116 and 117 and Internet 114.

Mobile stations 102 and 103 may be any mobile devices arranged to carry out the mobile-station functions described herein. As such, mobile stations 102 and 103 may each include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may comprise an antenna and a chipset for communicating with one or more macro base stations and/or one or more LCIBs over suitable air interfaces. As an example, the chipset could be one that is suitable for CDMA communication. The chipset or wireless-communication interface in general may also be able to communicate with other types of networks and devices, such as EV-DO networks, Wi-Fi networks, Bluetooth devices, and/or one or more additional types of wireless networks. The processor and data storage may be any suitable components known to those of skill in the art. As examples, one or both of mobile stations 102 and 103 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile stations 102 and 103, over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIBs 116 and 117 may be any computing and communication devices arranged to carry out the LCIB functions described herein. As such, LCIBs 116 and 117 may each include a communication interface, a processor, and data storage comprising instructions executable by the processor for carrying out those LCIB functions. The communication interface may include a wireless interface for communicating with one or more mobile stations according to a protocol such as CDMA, as well as an Ethernet or WiFi interface for communicating with a device such as a router and/or a cable modem. Each LCIB may also have a GPS receiver and/or other location module. LCIBs 116 and 117 are also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIBs 116 and 117, enabling the LCIBs to communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on service-provider network 110, and beyond.

Among other functions, LCIB controller 122 communicates via VPN terminator 120 with LCIBs such as LCIBs 116 and 117. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

b. An Exemplary LCIB

Figure 2:
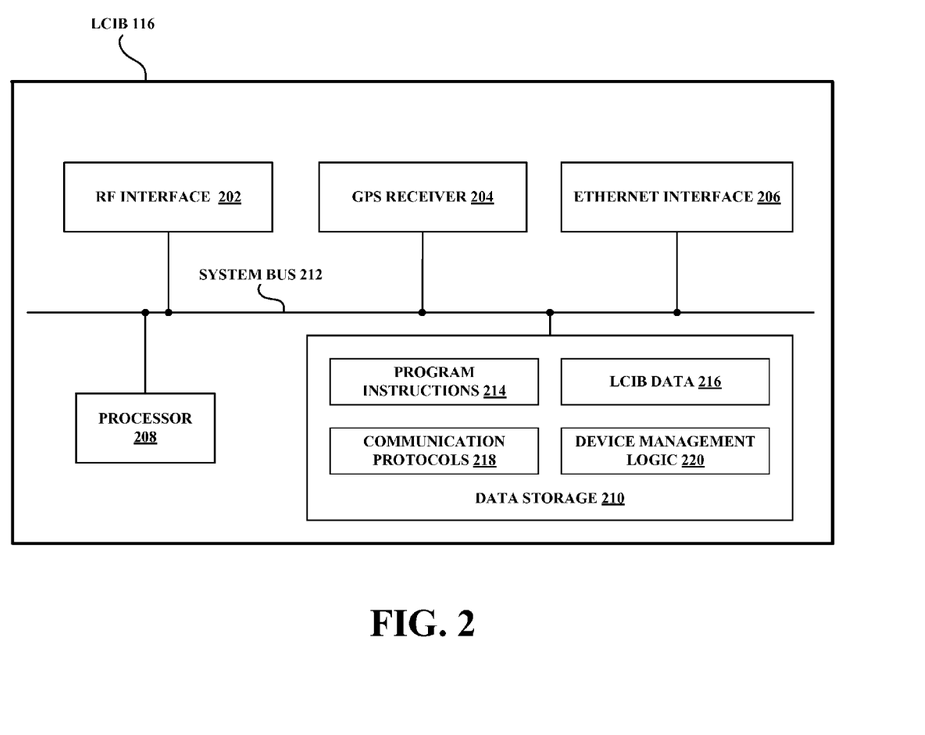
FIG. 2 is a simplified block diagram of an LCIB, in accordance with exemplary embodiments.

FIG. 2 depicts an exemplary diagram of LCIB 116 of FIG. 1. Note that LCIB 117 of FIG. 1 may have a similar set of components. As seen in FIG. 2, LCIB 116 includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA. GPS receiver 204 may be any known or hereafter developed GPS receiver, suitable for receiving and decoding GPS signals for location and timing purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic, perhaps for memory and file management.

3. Exemplary Operation a. A First Exemplary Method

Figure 3:
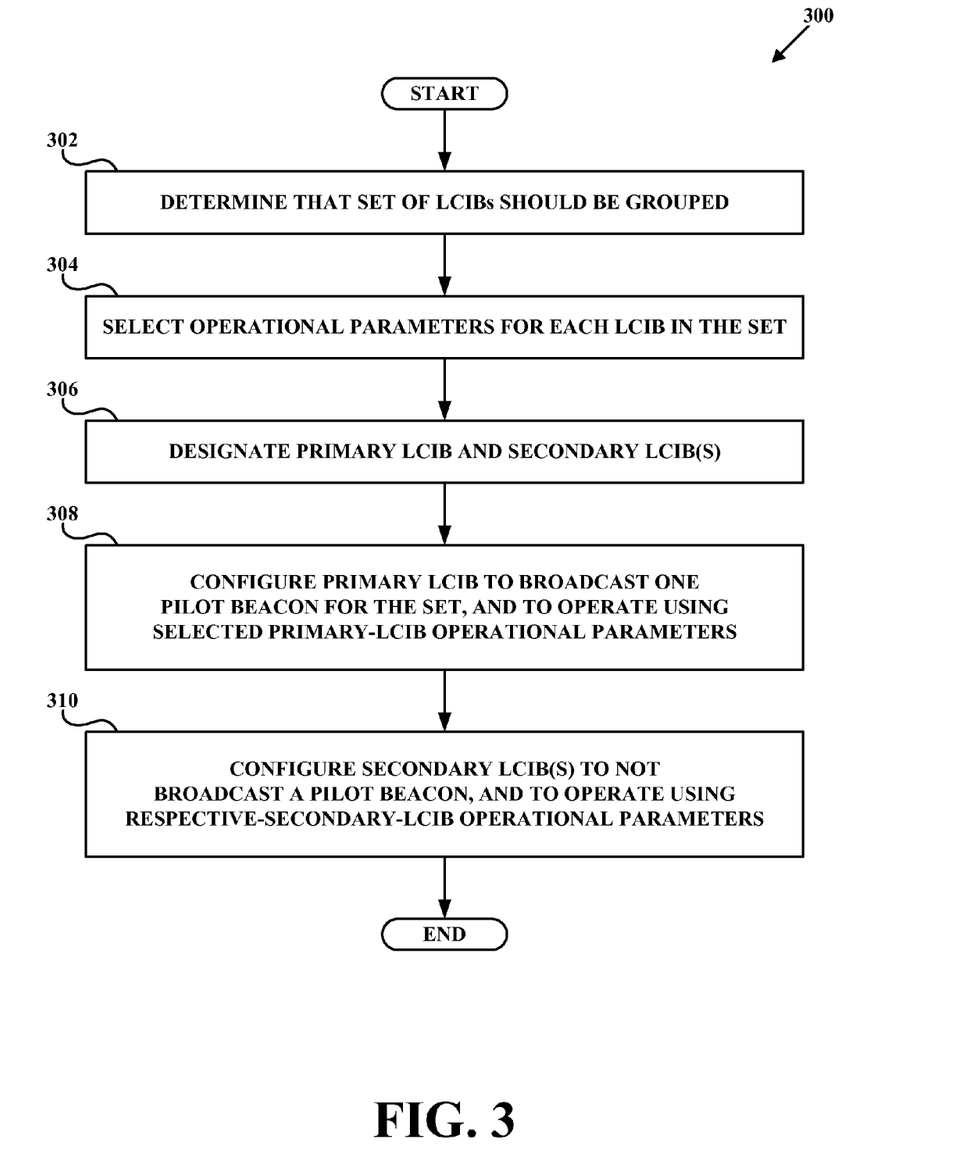
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when LCIB controller 122 determines that LCIBs 116 and 117 should be logically paired (more generally, grouped). At step 304, LCIB controller 122 selects operational parameters for LCIBs 116 and 117. At step 306, LCIB controller 122 designates LCIB 116 as the primary LCIB, thereby designating LCIB 117 as the secondary LCIB.

At step 308, LCIB controller 122 configures LCIB 116 to broadcast a pilot beacon that includes acquisition information for both LCIB 116 and LCIB 117, where the acquisition information includes at least some of the operational parameters selected for each LCIB. LCIB controller 122 also configures LCIB 116 to operate using the operational parameters selected for LCIB 116. At step 310, LCIB controller 122 configures LCIB 117 to not broadcast a pilot beacon, and to operate using the operational parameters selected for LCIB 117. These steps are further explained in the following subsections. And it should be noted that, although method 300 is described as being carried out by LCIB controller 122, this is not required. In some embodiments, method 300 may be carried out by LCIB 116, or perhaps by LCIB 117. In general, method 300 could be carried out by any one or any combination of the network elements described herein, or any other network element(s).

i. Determining that a Set of LCIBs Should be Logically Grouped

At step 302, LCIB controller 122 determines that LCIBs 116 and 117 should be logically grouped. As described above, each of LCIB 116 and 117 may have a wireless-communication interface for providing a (e.g. CDMA) coverage area for at least one mobile station (e.g. mobile stations 102 and 103), a packet-data (e.g. Ethernet or WiFi) interface for communicating over at least one packet-data network (e.g. Internet 114) with LCIB controller 122, a processor, and data storage. For secure communication with LCIB controller 122, LCIB 116 and LCIB 117 may each, upon being powered on, establish a VPN connection with VPN terminator 120.

After being powered on and establishing their respective VPN connections, the LCIBs may undergo an auto-configuration process, during which they will acquire their location using their GPS receivers, and then send a configuration request to LCIB controller 122, where the configuration request includes that location information. In response, LCIB controller 122 will transmit configuration data, such as one or more operational parameters, to the LCIBs. These parameters may include specification of a carrier on which to provide service, a PN offset to use, a transmission-power level, channel-list message contents, neighbor-list message contents, etc.

So, assuming LCIB 116 is the first in time to be powered on and undergo this auto-configuration process, LCIB controller 122 will see LCIB 116 as operating alone, or as a system of one (as another way to look at it), and LCIB controller 122 will thus instruct LCIB 116 to use a first carrier, a first PN offset, a first power level, and to broadcast a pilot beacon (which may be either fixed or frequency-hopping, depending on the macro-network environment in that area) that includes a channel-list message that includes reference to that first carrier.

Then, at some time thereafter, LCIB 117 is powered on (or perhaps reset), at which time it undergoes its auto-configuration process. LCIB 117 sets up a VPN connection over Internet 114 with VPN terminator 120, and then sends a configuration request to LCIB controller 122 via that VPN connection. This configuration request includes the current GPS location of LCIB 117, as determined using its internal GPS receiver.

LCIB controller 122 may determine via additional information in the request, such as a source IP address (if LCIBs 116 and 117 are behind the same network-address-translation (NAT) device), a serial number, or other identifier of LCIB 117, that both LCIB 117 and LCIB 116 are in use by the same subscriber (i.e. are associated with the same subscriber account). As one example, when a subscriber purchases an LCIB, perhaps online from a service provider, that LCIB's serial number may be tied to the subscriber's account. In another example, a subscriber may conduct an online registration process that ties an identifier (serial number, MAC address, etc.) of the LCIB to the subscriber's account. And other examples are possible as well.

Furthermore, in addition to determining that LCIB 116 and LCIB 117 are associated with the same subscriber's account, LCIB controller 122 may compare the location data provided by those two LCIBs, and determine that they are within a threshold distance of each other, such as being within 250 feet of each other, or some similar number. In some implementations, this proximity may be a sufficient condition for grouping LCIBs. In other implementations, both the account-association and geographic-proximity conditions may be required. The account-association condition may be used in isolation, though this is not preferable, as a subscriber may have, say, one LCIB at home and a second LCIB at a vacation home, many miles away. Logical grouping in accordance with the present invention would be inadvisable there, as one of those two LCIBs would not emit a pilot beacon, and thus be essentially invisible to mobile stations.

Note that, in some embodiments, the determination that two or more LCIBs should be logically paired/grouped in accordance with the present invention may be input manually into the LCIB controller, one or more of the LCIBs, a personal computer that may be on the same network (e.g. same private wireless network) or otherwise connected (e.g. via USB) to one or more of the LCIBs, through an online interface, and/or via one or more other communication channels. Essentially, the LCIB controller can be instructed to pair/group LCIBs in accordance with the principles of the present invention, rather than having to auto-detect that it should.

ii. Select Operational Parameters for Each LCIB in the Grouping

At step 304, LCIB controller 122 selects respective operational parameters for each LCIB in the set of LCIBs to be configured. In this example, LCIB controller 122 selects operational parameters for LCIB 116 and LCIB 117. In particular, LCIB controller 122 selects one carrier frequency for LCIB 116, a different carrier frequency for LCIB 117, a single PN offset for both LCIB 116 and LCIB 117 to use, and a transmission-power level that both LCIBs will use. Note that, in some embodiments, some parameters of LCIBs could have default values. For example, LCIB controller 122 may not need to specify a transmission-power level for the LCIBs if their default transmission-power level is considered appropriate.

iii. Designate a Primary LCIB

At step 306, LCIB controller 122 designates LCIB 116 as the primary LCIB, thereby designating LCIB 117 as the secondary LCIB. As stated above, this designation could be done randomly, by first (or last) in time to contact LCIB controller 122, by an ordering of some identifier such as serial number or MAC address, or by any other selection criteria.

iv. Configure Primary LCIB

At step 308, LCIB controller 122 configures LCIB 116 to broadcast a pilot beacon that includes acquisition information for all of the LCIBs in the set, i.e. for both LCIB 116 and for LCIB 117. Thus, LCIB controller 122 may transmit instructions to LCIB 116 that indicate to LCIB 116 that it is the primary LCIB in its system, and thus that it should activate its pilot beacon. Moreover, LCIB controller 122 may transmit a channel-list message to LCIB 116 for its pilot beacon. This channel-list message would include information as to both LCIB 116's carrier and PN offset, and LCIB 117's carrier and PN offset.

Further, LCIB controller 122 may instruct LCIB 116 as to whether to emit a fixed pilot beacon on one particular carrier, or to emit a frequency-hopping pilot beacon on a number of carriers. In some embodiments, however, it may be sufficient to instruct LCIB 116 to emit a pilot beacon, and LCIB 116 may then determine, using an internal CDMA transceiver, whether a fixed pilot beacon would suffice, or whether a frequency-hopping pilot beacon is called for by the RF environment. Furthermore, LCIB controller 122 will transmit information to LCIB 116 as to what carrier, PN offset, power level, etc. LCIB 116 should use for its own operations.

LCIB 116 will then operate using those parameters, and will broadcast a pilot beacon that includes information pertinent to itself and to LCIB 117. Essentially, it will broadcast LCIB 117's pilot-beacon overhead information so that LCIB 117 does not have to do so.

v. Configure Secondary LCIB(s)

At step 310, LCIB controller 122 configures LCIB 117 to not broadcast a pilot beacon, and further configures LCIB 117 to operate using the operational parameters selected for LCIB 117. Again, these operational parameters may include carrier, PN offset, transmission power, etc. LCIB controller 122 may transmit these instructions, along with an indication that LCIB 117 is a secondary LCIB in its system (and thus should not broadcast a pilot beacon), via the VPN connection established between LCIB controller 122 and LCIB 117.

Furthermore, to the extent there are any additional LCIBs in a given system, LCIB controller 122 would similarly configure those as secondary LCIBs, such that they would each provide service on a distinct carrier, but would not transmit a pilot beacon, since that would be taken care of by the primary LCIB 116.

Thereafter, if a given mobile station, such as mobile station 102, is registered on one of the two LCIBs in the system, and a call is either placed by mobile station 102 or is received at the LCIB for mobile station 102, several different actions may be taken. If the LCIB on which mobile station 102 is registered is not at or near capacity with respect to its channel elements, power output, or any other limiting factor, then that LCIB could just handle the call.

If, on the other hand, that LCIB is at or near capacity in some sense, then either the LCIB or the LCIB controller could cause a redirect message—such as a traffic channel assignment message (TCAM)—to be sent to mobile station 102, directing it to use the carrier offered by the other (or one of the other) LCIBs in the system. The mobile station could then tune to that carrier, which would cause it to be served by the other LCIB.

And, in general, as mobile stations register on the LCIB system, they will use a hash function to choose among the carriers listed in the channel-list message that is broadcast in the pilot beacon emitted by the primary LCIB. As such, a fairly even distribution of mobile stations across LCIBs in a given system should prevail over time.

b. A Second Exemplary Method

Figure 4:
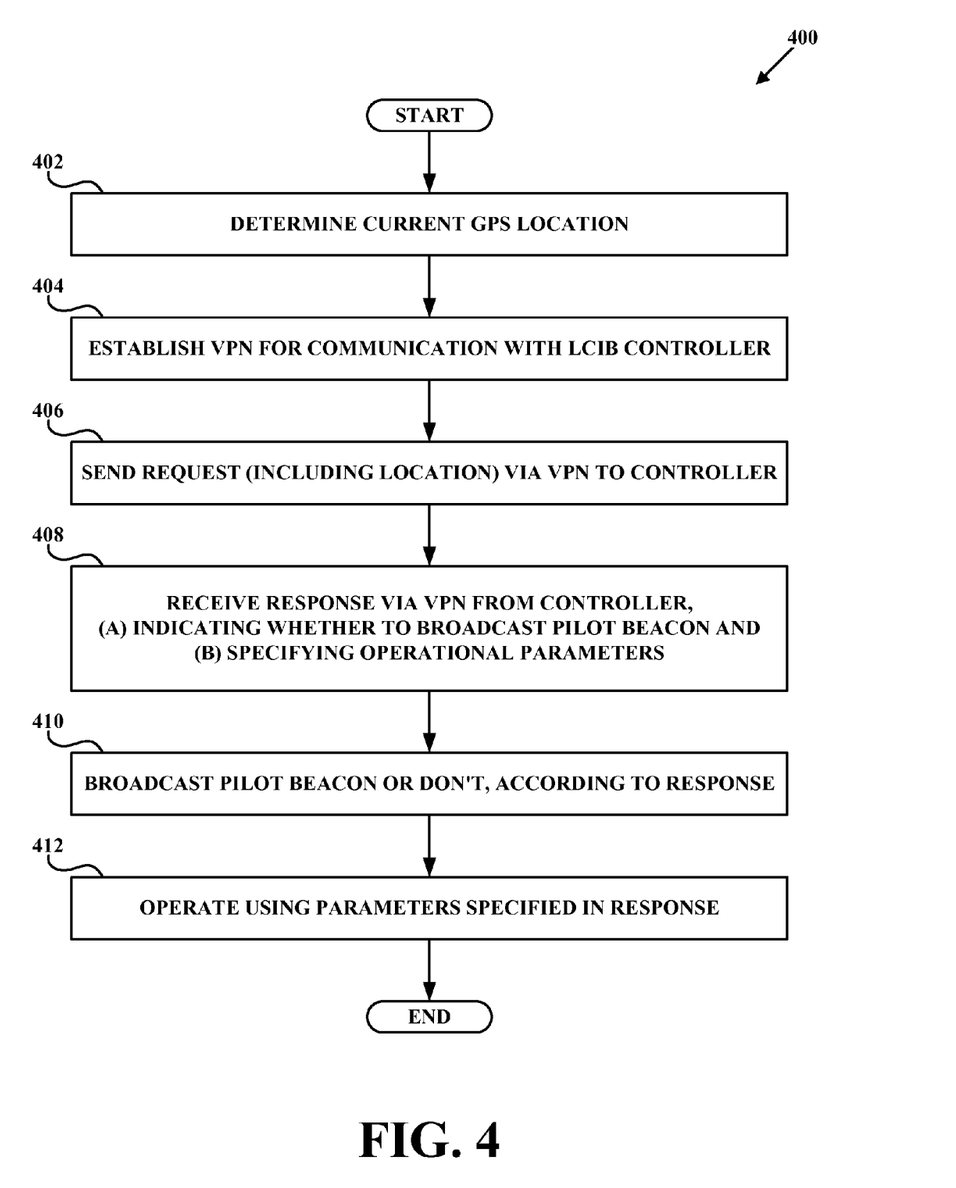
FIG. 4 is a flowchart of a method, in accordance with exemplary embodiments.

FIG. 4 is a flowchart of a second exemplary method, in accordance with an exemplary embodiment. Note that method 400 may be carried out by an LCIB, such as LCIB 116 or 117; furthermore, method 400 is related in some respects to method 300, and thus is not described in as great of detail. As shown in FIG. 4, method 400 begins at step 402, when an LCIB—perhaps in response to being powered on or to being reset—uses its GPS receiver to determine its location. At step 404, the LCIB establishes a VPN connection with VPN terminator 120 across Internet 114, thus giving the LCIB secure access to communicating with LCIB controller 122. Note that in some embodiments, whether pertaining to method 400 or method 300 or otherwise, the VPN-terminator functionality could be a functional component of LCIB controller 122.

Next, at step 406, the LCIB transmits a configuration request over the VPN to LCIB controller 122, where the request includes the current location of the LCIB. As described above, LCIB controller 122 may then determine that the LCIB making the request should be logically paired (grouped) with at least one other LCIB. LCIB controller 122 will determine whether the requesting LCIB will be the primary LCIB or a secondary LCIB in its system, and may select carriers for each LCIB in the system, a PN offset for all LCIBs in the system, a transmission-power level for all LCIBs in the system, etc. LCIB controller 122 may also construct a channel-list message for whichever LCIB will be the primary one.

At step 408, the requesting LCIB receives a response over the VPN from LCIB controller 122, the response (a) indicating whether or not the LCIB should broadcast a pilot beacon (i.e. whether or not the LCIB is the primary one) and (b) specifying one or more operational parameters for the LCIB, such as carrier, PN offset, power level, channel-list message, etc. At step 410, the LCIB either activates its pilot beacon or not, according to the response message. At step 412; the LCIB operates using the one or more operational parameters from the response, including providing a wireless coverage area for one or more mobile stations.

4. Conclusion

Various exemplary embodiments have been described above. Those skilled in the art will understand, however, that changes and modifications may be made to those examples without departing from the scope of the claims.

What is claimed is:

1. A method comprising:
   determining that a set of multiple low-cost Internet base stations (LCIBs) should be logically grouped;
   selecting respective operational parameters for each respective LCIB in the set;
   designating a given LCIB in the set as a primary LCIB, thereby designating the other LCIBs in the set as secondary LCIBs;
   configuring the primary LCIB to broadcast a pilot beacon comprising acquisition information for all of the LCIBs in the set, wherein the acquisition information comprises at least some of the operational parameters selected for each respective LCIB in the set, and further configuring the primary LCIB to operate using the operational parameters selected for the primary LCIB; and
   configuring each secondary LCIB to not broadcast a pilot beacon, and further configuring each secondary LCIB to operate using the respective operational parameters selected for the respective secondary LCIB.

2. The method of claim 1, carried out by at least one of an LCIB controller, the primary LCIB, and at least one secondary LCIB.

3. The method of claim 1, wherein each LCIB comprises a wireless-communication interface for providing a wireless coverage area for at least one mobile station, a packet-data interface for communicating over at least one packet-data network with an LCIB controller, a processor, and data storage.

4. The method of claim 3, wherein the wireless coverage area comprises a code division multiple access (CDMA) coverage area, wherein the packet-data interface comprises at least one of an Ethernet interface and a WiFi interface, and wherein the at least one packet-data network comprises the Internet.

5. The method of claim 4, wherein communicating over at least one packet-data network with the LCIB controller comprises establishing a virtual-private-network (VPN) connection with at least one of the LCIB controller and a VPN terminator in communication with the LCIB controller.

6. The method of claim 1, wherein determining that the set of LCIBs should be logically grouped comprises:
receiving location information for each LCIB in the set; and
determining that each LCIB in the set is located within a threshold distance of at least one other LCIB in the set.

7. The method of claim 6, wherein receiving the location information for each LCIB in the set comprises receiving the location information for each respective LCIB in the set from the respective LCIB.

8. The method of claim 7, wherein each LCIB in the set comprises a Global Positioning System (GPS) receiver, and wherein the location information comprises GPS information.

9. The method of claim 6, wherein determining that the set of LCIBs should be logically grouped further comprises determining that each LCIB in the set is associated with a particular subscriber account.

10. The method of claim 1, wherein the operational parameters comprise at least one of carrier frequency, whether or not to transmit a pilot beacon, pseudorandom (PN) offset, transmission-power level, channel-list message, and neighbor list.

11. The method of claim 10, wherein a different carrier frequency is selected for each LCIB in the set, wherein the same PN offset is selected for each LCIB in the set, wherein the same transmission-power level is selected for each LCIB in the set, and wherein the acquisition information for all of the LCIBs in the set comprises the selected carrier frequencies.

12. The method of claim 1, wherein configuring a given LCIB to operate using operational parameters selected for the given LCIB comprises transmitting the selected operational parameters to the given LCIB.

13. The method of claim 1, further comprising:
establishing a first virtual-private-network (VPN) connection with the primary LCIB; and
establishing an additional VPN connection with each secondary LCIB.

14. The method of claim 1, further comprising directing a mobile station that is initially registered with one LCIB in the set to conduct a communication session using another LCIB in the set.

15. The method of claim 14, wherein directing the mobile station to conduct the communication session using the other LCIB comprises sending a traffic channel assignment message to the second mobile station.

16. A low-cost Internet base station (LCIB) controller comprising:
a communication interface;
a processor; and
data storage comprising instructions executable by the processor to:
determine that a set of multiple LCIBs should be logically grouped;
select respective operational parameters for each respective LCIB in the set;
designate a given LCIB in the set as a primary LCIB, thereby designating the other LCIBs in the set as secondary LCIBs;
configure the primary LCIB to broadcast a pilot beacon comprising acquisition information for all of the LCIBs in the set, wherein the acquisition information comprises at least some of the operational parameters selected for each respective LCIB in the set, and further configure the primary LCIB to operate using the operational parameters selected for the primary LCIB; and
configure each secondary LCIB to not broadcast a pilot beacon, and further configure each secondary LCIB to operate using the respective operational parameters selected for the respective secondary LCIB.

17. The LCIB controller of claim 16, wherein the instructions to determine that the set of LCIBs should be logically grouped comprise instructions to:
receive location information for each LCIB in the set from the respective LCIB;
determine that each LCIB in the set is located within a threshold distance of at least one other LCIB in the set; and
determine that each LCIB in the set is associated with a particular subscriber account.

18. The LCIB controller of claim 16, wherein the operational parameters comprise a carrier frequency, whether to transmit a pilot beacon, a pseudorandom (PN) offset, and a transmission-power level, wherein a different carrier frequency is selected for each LCIB in the set, wherein the same PN offset is selected for each LCIB in the set, wherein the same transmission-power level is selected for each LCIB in the set, and wherein the acquisition information for all of the LCIBs in the set comprises the selected carrier frequencies.

19. A method comprising:
using a Global Positioning System (GPS) receiver to determine a current location;
establishing a virtual-private-network (VPN) connection with a VPN terminator, wherein the VPN terminator is communicatively connected with an LCIB controller;
transmitting a configuration request over the VPN connection to the LCIB controller, the request comprising the current location;
receiving a configuration response over the VPN connection from the LCIB controller, the response (a) indicating whether or not to broadcast a pilot beacon and (b) identifying one or more operational parameters;
broadcasting the pilot beacon or not doing so, according to the response; and
operating using the one or more operational parameters from the response, wherein operating comprises providing a wireless coverage area for one or more mobile stations.

20. The method of claim 19, the operational parameters comprising at least one of a carrier, a pseudorandom (PN) offset, a transmission-power level, and a channel-list message.

* * * * *